(12) United States Patent
Nylander-Hill et al.

(10) Patent No.: US 7,280,293 B2
(45) Date of Patent: Oct. 9, 2007

(54) MULTI-LEVEL MAPPING OF TAPE ERROR RECOVERIES

(75) Inventors: Pamela R Nylander-Hill, Tucson, AZ (US); Ernest S Gale, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 11/183,540

(22) Filed: Jul. 18, 2005

(65) Prior Publication Data

US 2007/0014042 A1    Jan. 18, 2007

(51) Int. Cl.
*G11B 27/36* (2006.01)
*G11B 5/09* (2006.01)

(52) U.S. Cl. .......................... 360/31; 360/53
(58) Field of Classification Search ............... None
See application file for complete search history.

(56) References Cited

U.S. PATENT DOCUMENTS

| | | | |
|---|---|---|---|
| 5,386,324 A * | 1/1995 | Fry et al. ....................... | 360/53 |
| 6,269,422 B1 | 7/2001 | McDonald et al. | |
| 6,408,405 B1 | 6/2002 | McDonald et al. | |
| 2001/0042222 A1 | 11/2001 | Kedem et al. | |
| 2004/0010499 A1 | 1/2004 | Ghosh et al. | |
| 2004/0019835 A1 | 1/2004 | Marisetty et al. | |
| 2004/0025077 A1 | 2/2004 | Salem | |
| 2005/0216782 A1 * | 9/2005 | Saitoh .......................... | 714/2 |

* cited by examiner

*Primary Examiner*—William Korzuch
*Assistant Examiner*—Daniell L. Negrón
(74) *Attorney, Agent, or Firm*—Dan Shifrin

(57) ABSTRACT

Method and apparatus are provided for presenting various levels of detail about successful error recoveries and background hardware optimizations during the recording and retrieval of digital information on magnetic tape. A first, Band Summary, report presents a high-level summary of recovery methods by data band and wrap. A second, Detail Summary, report presents a mid-level summary of recovery methods by track and longitudinal position (LPOS) region within one wrap of a band on the tape. A third, ERP Summary, report presents a low-level summary of errors and specific recovery methods and optimizations by LPOS region within each wrap. Such "telescoping" views permit pattern analysis to be performed at different resolutions. Thus, correlations of possible interactions between hardware and microcode activities that result in changes of the nominal operating point of the drive may be identified. Possible failure patterns may also be identified and fed back to design personnel and incorporated in microcode design changes for more effective ERP.

10 Claims, 5 Drawing Sheets

FIG. 3 – Band Summary

FIG. 4 – Detail Summary

FIG. 5 – ERP Summary

MULTI-LEVEL MAPPING OF TAPE ERROR RECOVERIES

TECHNICAL FIELD

The present invention is directed generally to the recording and retrieval of digital information on magnetic tape and, in particular, to providing various levels of detail about successful error recoveries.

BACKGROUND ART

Conventional data storage tape drives employ various error correction and recovery methods to detect and correct data errors which, if left unresolved, would compromise the integrity of information read from or written to the magnetic tape media. Events which can lead to data errors include defects on the media, debris between the tape head and the media, and other conditions that interfere with head/media data transfer operations.

Error correction and recovery may be thought of as two distinct operations that are employed at different stages of error processing. Error correction is conventionally implemented using error correction coding (ECC) techniques in which host data to be placed on a tape medium is encoded in a well-defined structure by introducing data-dependent redundancy information. The presence of data errors is detected when the encoded structure is disturbed. The errors are corrected by making minimal alternations to reestablish the structure. ECC error correction is usually implemented "on-the-fly" as data is processed by the tape drive apparatus. Various encoding schemes are known in the art.

Error recovery occurs when ECC error correction is unable to correct data errors or when thresholds for allowable error correction are exceeded. The error recovery process may require stopping the tape and reprocessing a data block in which an error was detected. Typical error recovery procedures include tape refresh operations wherein a tape is wound to its end and brought back to the error recovery point, tape backhitch or "shoeshine" operations wherein a tape is drawn back and forth across the tape head, backward tape read operations, tape tension adjustment operations and tape servo adjustment operations, to name a few, which a drive might be capable of (although not all drives may be capable of performing all such error recovery procedures).

Basic tape "mapping" has been employed to summarize errors and performance parameters by physical tape location. The resulting map may be offloaded from the tape drive via a host interface command or as a subset of a product dump file; it may then be formatted for engineering analysis by the manufacturer of the drive. Such mapping has typically been designed to focus on visualizing the tape media quality and recording channel defects. However, with the increasing design sophistication required to accomplish ever increasing data densities on the tape, there is a corresponding increasing reliance on complex recoveries and optimization performed internally by microcode, some of which may not be visible and therefore not available for analysis.

SUMMARY OF THE INVENTION

The present invention provides method, system and computer program product for presenting various levels of detail about successful error recoveries during the recording and retrieval of digital information on magnetic tape. A method includes performing data write and/or read operations on a tape medium mounted in a data storage tape drive, receiving information pertaining to successful recoveries from corresponding errors during the data operations, mapping the successful error recovery information to associate each error recovery with a physical location on the tape medium, mapping any hardware optimization of the read/write channel or servo system performed as a preventative measure, generating a first output report providing a first level of error recovery detail, and generating a second output report providing a second level of error recovery detail, the second output report having more of detail than the first output report.

The system includes an error recovery controller operable to initiate recovery processes in response to errors detected during data write and/or read operations on a tape medium mounted in a data storage tape drive, an error recovery controller operable to initiate preventative recovery processes in response to statistical assessment of read/write channel and servo performance detected during data write and/or read operations on a tape medium mounted in a data storage tape drive, an error recovery logger and a report generator. The error recovery logger is operable to record locations of the errors on the tape medium, a recovery method associated with each error, a preventative recovery method associated with thresholded statistical performance data, and values of a plurality of operational parameters at the time of each error. The report generator is operable to generate a first output report providing a first level of error recovery detail and a second output report providing a second level of error recovery detail, the second output report having more of detail than the first output report.

The computer program product includes having computer-readable code embodied therein for mapping error corrections in a magnetic tape drive data storage system, the computer-readable code comprising instructions for performing data write and/or read operations on a tape medium mounted in a data storage tape drive, receiving information pertaining to recoveries from corresponding errors during the data operations, receiving information pertaining to background hardware optimization not performed in response to error stimulus but due to thresholding of statistical data collected dynamically during data operations, mapping the error recovery information to associate each error recovery with a physical location on the tape medium, generating a first output report providing a first level of error recovery detail, and generating a second output report providing a second level of error recovery detail, the second output report having more of detail than the first output report.

A first, Band Summary, report may present a high-level summary of recovery methods by data band and wrap. A second, Detail Summary, report may present a mid-level summary of recovery methods by track and longitudinal position (LPOS) region within one wrap of a band on the tape. A third, ERP Summary, report may present a low-level summary of errors and specific recovery methods by LPOS region within each wrap. Such "telescoping" views permit pattern analysis to be performed at different resolutions. Thus, correlations of possible interactions between hardware and microcode activities that result in changes of the nominal operating point of the drive may be identified. Possible failure patterns may also be identified and fed back to design personnel and incorporated in microcode design changes for more effective ERP.

BRIEF DESCRIPTION OF THE DRAWINGS

FIG. 3 is an example of a Band Summary report of the present invention;

FIG. 4 is an example of a Detail Summary report of the present invention; and

FIG. 5 is an example of a Error Recovery Procedure (ERP) Summary report of the present invention.

DETAILED DESCRIPTION OF THE PREFERRED EMBODIMENT

Figure 1:
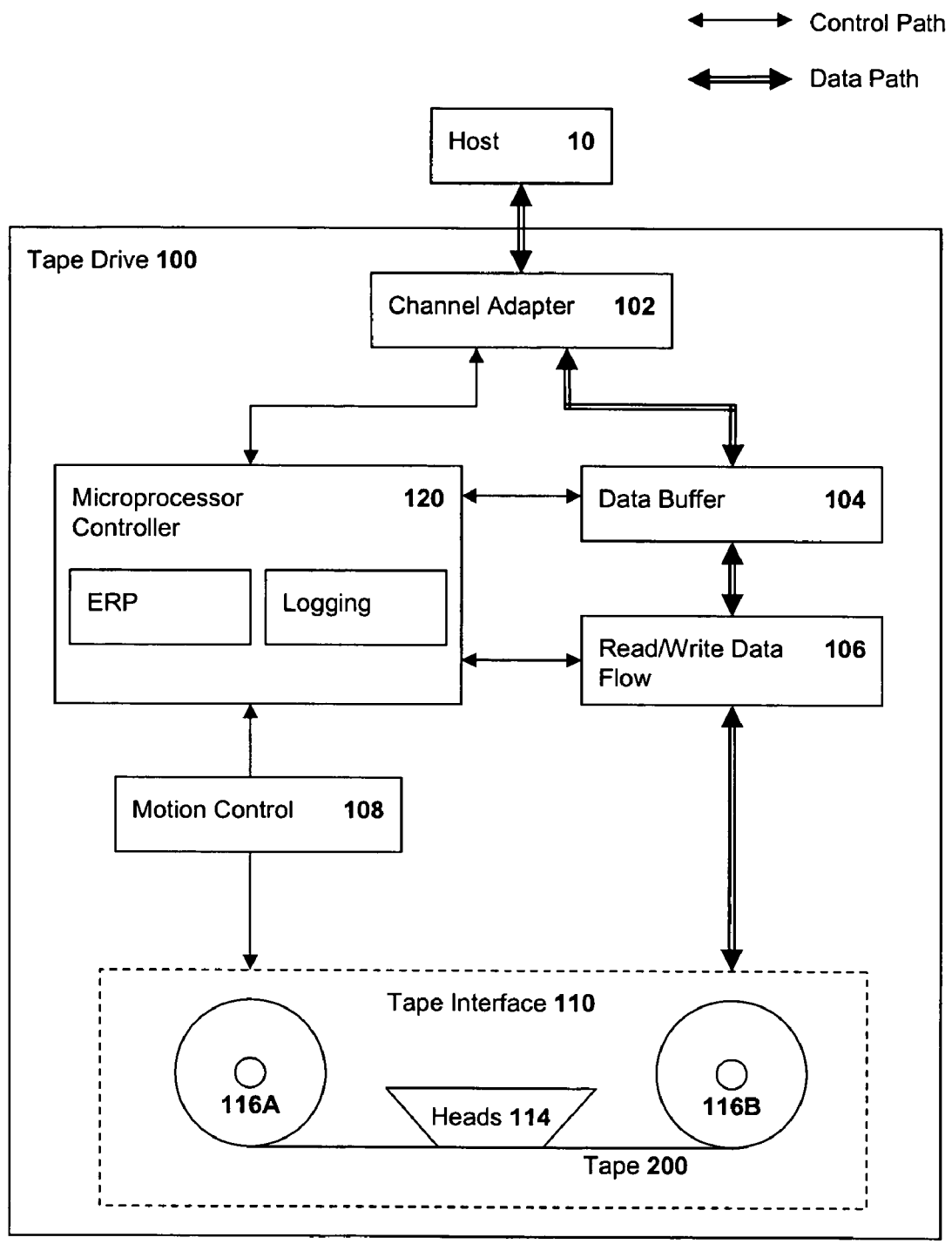
FIG. 1 is a block diagram of a magnetic tape drive in which the present invention may be incorporated.

FIG. 1 is a block diagram of a magnetic tape drive 100 in which the present invention may be incorporated. The tape drive 100 is coupled to a host device 10 through a channel or host adapter 102 from which the drive 100 receives data to be stored to, and transmits data read from, magnetic tape 200. The tape drive 100 further includes a data path and a control path. The data path includes a data buffer 104, coupled to receive data from and send data to the adapter 102, and read/write data flow circuitry 106, coupled between the buffer 104 and a tape interface system 110. The control path includes a microprocessor controller 120, coupled to receive control signals from, and send control and response signals to, the host device 10 through the adapter 102, and a motion control circuitry 108, coupled between the microprocessor controller 120 and the tape interface system 110.

The microprocessor controller 120 provides overhead control functionality for the operations of all other components of the tape drive 100. The functions performed by the microprocessor controller 120 are programmable via microcode routines, as is known in the art. During data write operations (with all dataflow being reversed for data read operations), the microprocessor controller 120 activates the adaptor 102 to perform the required host interface protocol for receiving an information data block. The adaptor 102 communicates the data block to the data buffer 104 which stores the data for subsequent read/write processing. The data buffer 104 in turn communicates the data to the read/write dataflow circuitry 106, which formats the device data into physically formatted data that may be recorded on the magnetic tape 200. The read/write dataflow circuitry 106 is also responsible for executing all read/write data transfer operations under the control of the microprocessor controller 120. Formatted physical data from the read/write dataflow circuitry 106 is communicated to a tape interface system 110 which includes one or more read/write heads within a head assembly 114 and appropriate drive components (not shown) for performing forward and reverse movement of the tape 200 mounted on supply and take-up reels 116A and 116B. The drive components are controlled by the motion control system 108 to execute such tape movements as forward and reverse recording and playback, rewind and other tape motion functions. In addition, in multi-track tape drive systems, the motion control system 108 positions the read/write heads transversely relative to the longitudinal direction of tape movement in order to record data in a plurality of tracks.

High density multi-track recording may be accomplished by recording multiple data tracks onto the tape 200 using a plurality of small head elements incorporated into the head assembly 114, with each data track being written by one head element (i.e., read/write head channel). This data storage protocol is achieved using multiple tape wraps and tape wrap halves. A tape wrap consists of one outbound and one inbound recording/playback pass across the entire allocated length of the tape 200. The outbound pass represents a first wrap half while the inbound pass represents a second wrap half. There are typically multiple wraps, such as 42, recorded on the tape 200. Each wrap half extends across the entire usable portion of the tape 200.

Figure 2:
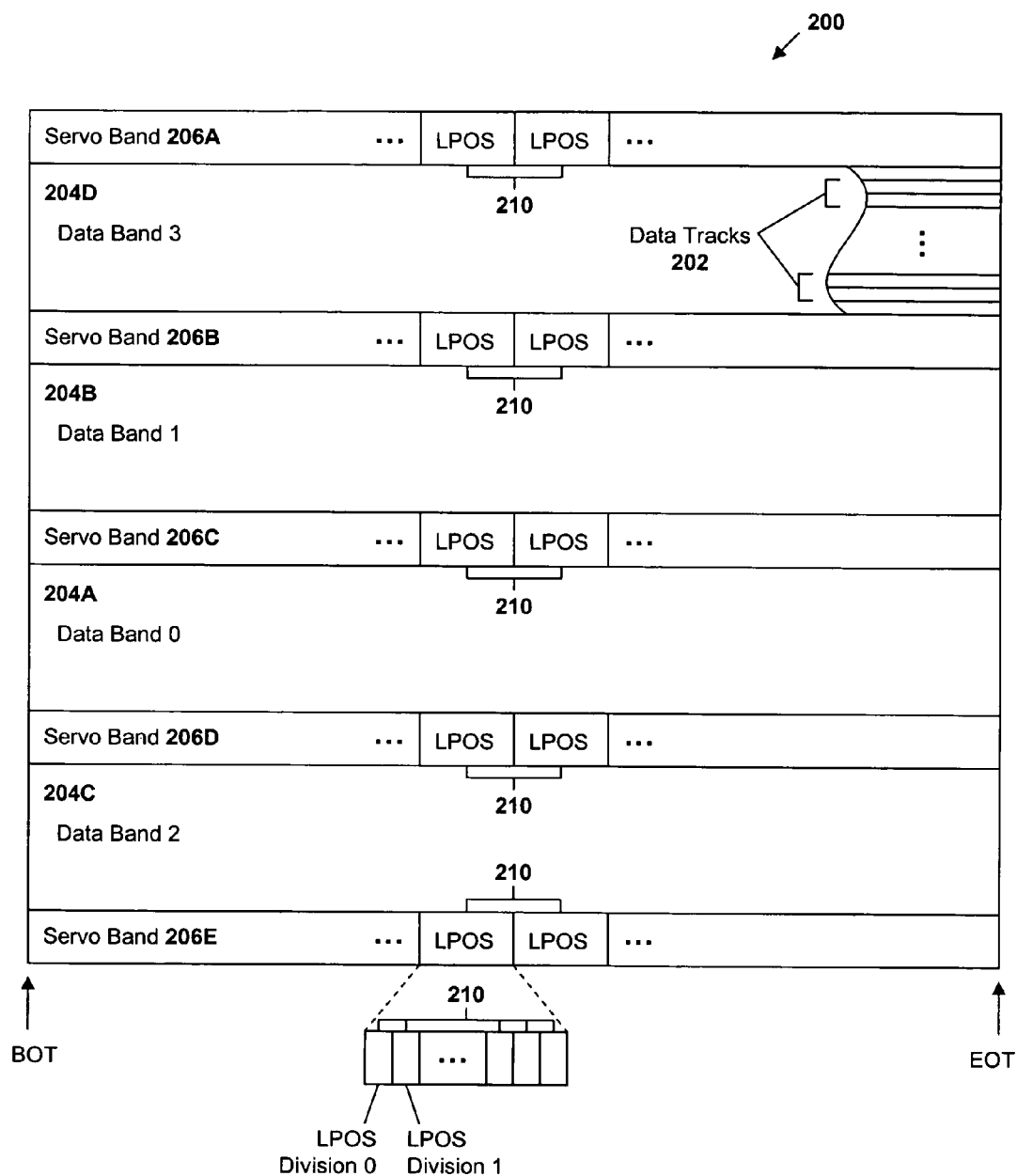
FIG. 2 schematically represents the format of magnetic tape media which may be used in the drive of FIG. 1.

FIG. 2 illustrates the manner in which the tape 200 may be formatted. A set of data tracks 202 is recorded on each of a plurality of data bands 204A, 204B, 204C, 204D which extend the length of the tape 200 from the beginning (BOT) to the end (EOT). Servo bands 206B, 206C, 206D separate the data bands 204A, 204B, 204C, 204D; additional servo bands 206A, 206E are formatted along the two edges of the tape 200. A periodic servo pattern is recorded on the servo bands 206A, 206B, 206C, 206D, 206E to be read by servo elements in the head assembly 114 to assist in maintaining proper head alignment relative to the tape 200.

For accurate longitudinal positioning of the tape 200 relative to the head assembly 114, the servo pattern is encoded with longitudinal position (LPOS) information which represents an absolute longitudinal address that appears at set intervals 210 along the length of the tape 200. In the LTO ("Linear Tape-Open") tape format, a unique LPOS word occurs every 7.2 mm along the tape 200. Thus, the drive can position itself longitudinally to a given LPOS to obtain a resolution of 7.2 mm. Longitudinal resolution can be further improved, such as to 200 µm, by sub-dividing each LPOS 212. In this disclosure, for logging purposes the LPOS positions encountered during a full tape pass are aggregated into larger, more manageable units referred to as LPOS regions.

After the tape 200 is mounted in the drive 100, tape processing proceeds through successive LPOS regions, wrap halves and wraps and various errors may occur. As disclosed in commonly-assigned U.S. Pat. No. 5,331,476, entitled "Apparatus and Method for Dynamically Performing Knowledge-Based Error Recovery", which patent is incorporated herein by reference in its entirety, the microprocessor controller 120 populates data structures with detected errors, successful recovery mechanisms, background optimizations, speed and dataflow corrections and other performance information, all associated with physical locations (wrap and LPOS region) on the tape 200, over the course of the tape mount.

The present invention employs additional microcode executed by the microprocessor controller 120 to identify where errors occur on the tape 200 as well as the specific hardware procedures, initiated by the microprocessor controller 120, that were required to resolve the errors. Such information highlights the effects on drive performance of both reactive and preventative microcode procedures. Reactive procedures involve error recovery procedures (ERP) in response to error situations whereas preventative procedures are performed in response to thresholded information that dynamically optimizes internal operating parameters of the drive. Both kinds of ERP can induce calibration, adaptive equalizations, servo tracking changes, mechanical brushing and cartridge reseating. Because of the large amount of information which is available, the present invention presents "telescoping" views of increasing resolution.

Figure 3:
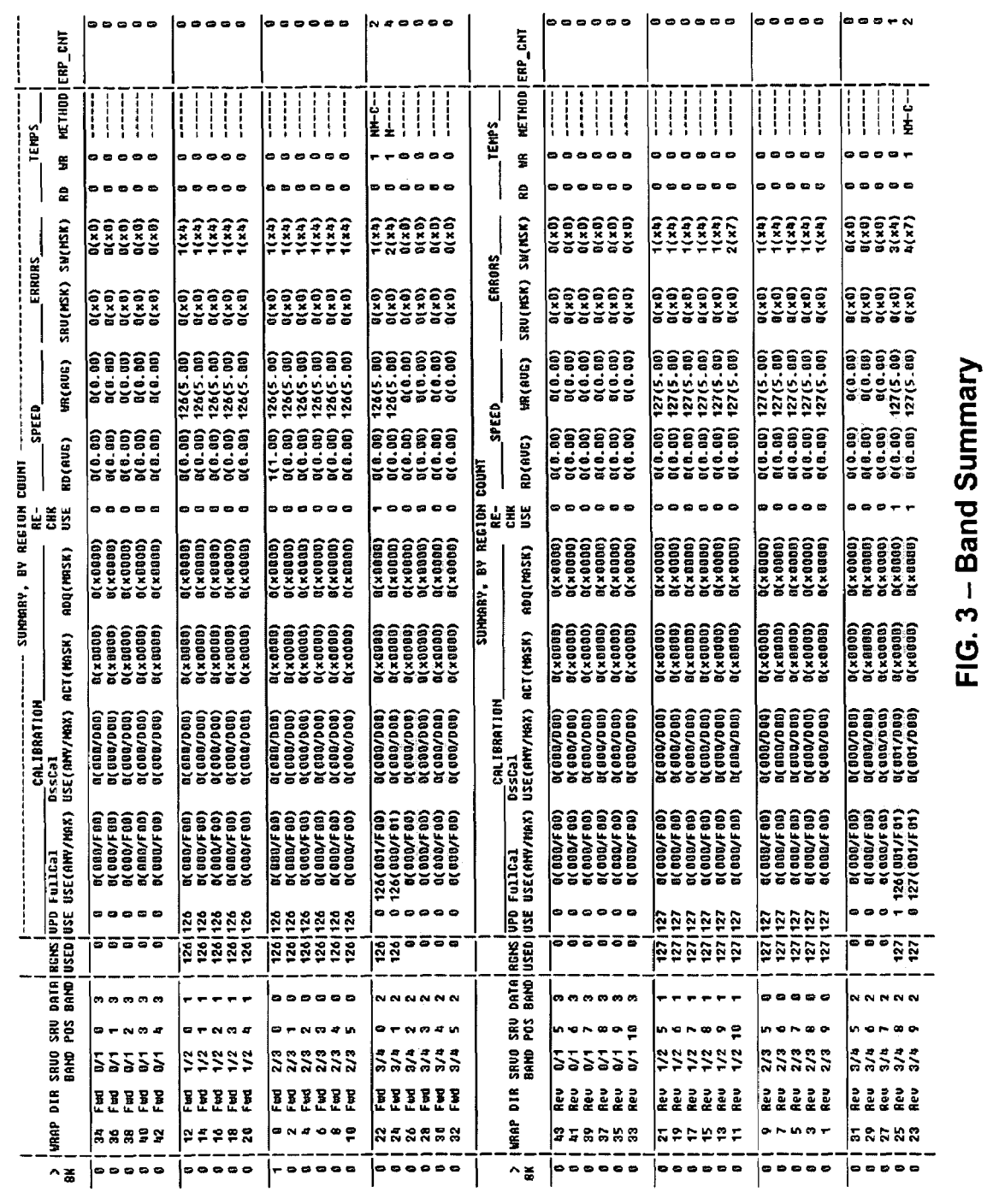

The table of FIG. 3 is illustrative of a Band Summary report which presents a high-level summary of recovery methods by data band and wrap. Information for each wrap half is provided in a corresponding row of the table. The wrap halves (0-43) are identified in the first column on the left (with the even numbered halves representing forward motion of the tape and the odd numbered halves representing reverse motion of the tape) and the data bands are identified in the fifth column. The sixth column indicates how many of the possible LPOS regions (127 in this example) were used in each wrap half. The remaining columns provide information about calibrations performed in response to errors (columns 7-11), recovery methods (columns 12-19) and ERP counts (column 20).

The calibration information includes full recalibrations (column 8), partial calibrations (column 9) and background channel optimization by track (columns 10 and 11). The recovery method information includes cartridge reseating attempts or "re-chucks" (column 12), read and write speed (columns 13 and 14), servo and StopWrite errors (columns 15 and 16), required reprocessing of read or write operations (columns 17 and 18) and the particular method used to recover from the errors (column 19). The servo and Stop-Write errors are summarized as a bit-mask of errors detected on a given half wrap. The recovery methods are organized into five groups of related hardware modifications and are logged by the identifiers: N, M, S, C, and D. These groups are defined but are not limited to the following: (S) servo methods such as OppServo (in which the forward (or backward) servo readers are employed when the backward (or forward) servo readers are nominally selected), PES (for servo tracking or offset changes to better track data), AgaGain (in which the servo reader gain is changed) and MatchFilter (which refers to the method by which the servo system interprets multiple servo signal feedback in order to maintain the correct longitudinal position); (C) channel/calibration methods such as read/write channel calibration); (D) dataflow correction methods such as operating range parameter changes; (M) mechanical methods such as rechuck and stepper motor indexing (which pertains to a servo modification used to control the vertical head position within the servo bands); (N) and no method which indicates a transient or a recovery without hardware intervention. It will be appreciated that the foregoing list of recovery methods is merely representative of recovery methods and that additional, fewer or other methods may be used. The Band 2 Summary of FIG. 3 indicates generally that some problems are present in wraps 22-25, but further details would be useful.

Figure 4:
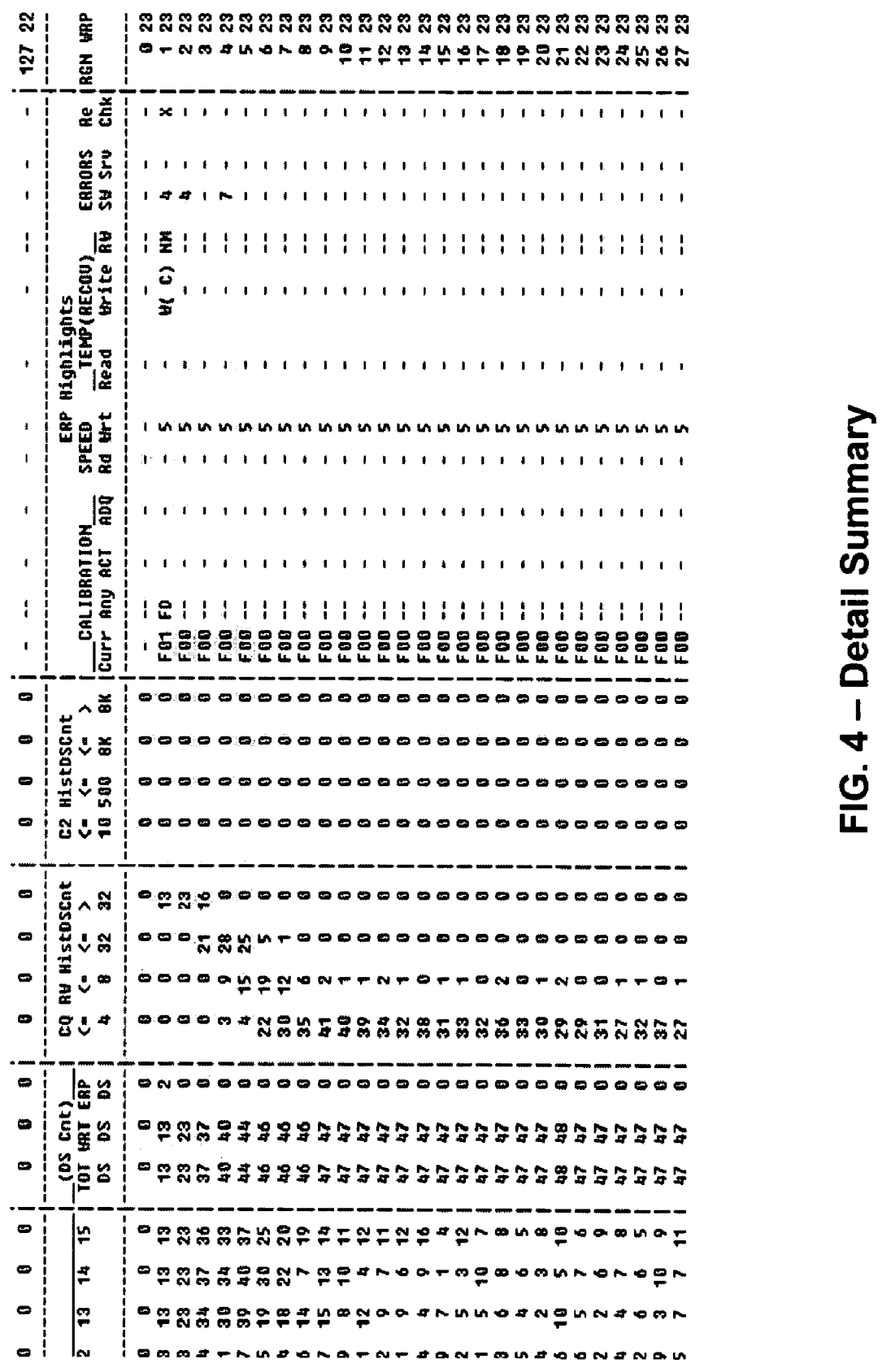

Such detail is provided in the table of FIG. 4 which is illustrative of a Detail Summary report for data band 2 and presents a mid-level summary of recovery methods by track and LPOS region within one wrap (wrap 23) of the band. The columns to the left of the first vertical separator indicate the dataflow correction required on each read/write channel track on a dataset count basis (only tracks 13-15 are shown in the table). The number of datasets processed in a particular LPOS region of a particular wrap is shown in the fourth column, the number of these datasets which were written as opposed to read appears in the fifth column, and the number of these datasets requiring an error recovery procedure is shown in the sixth column. For example, 13 datasets were written to LPOS region 1 of wrap 23 and all 13 required correction in tracks 13-15, but only 2 datasets required any error recovery action. The third set of columns indicates how many of the datasets within this LPOS region required size extension to rewrite one or more internal ECC codewords on-the-fly. This information is put into a histogram showing how many datasets required 4 or fewer rewrites each (column 7), 5-8 rewrites each (column 8), 9-32 rewrites each (column 9) and more than 32 rewrites each (column 9). The fourth set of columns illustrates a histogram of another attribute pertaining to ECC decode of the LTO format. The fifth set of columns provides ERP highlights for each LPOS region of the wrap, including calibration information (columns 15-18), read and write speed variations (columns 19 and 20), recovery type and methods (columns 21-24), bit-encoded summary of detected errors number of errors (columns 25 and 26) and whether a rechuck was performed (column 27). The Detail Summary report indicates that calibration is occurring at the beginning of the tape (BOT) in LPOS region 1. No StopWrite errors have occurred but the calibration may have been triggered by degraded write performance as detected by the dataflow hardware logic. The notation W(C) indicates that a write temp occured requiring read/write channel calibrations. Moreover, the NM notation in column 24 indicates that some write temps were "simple" write temps requiring no hardware modification (N) and some required mechanical methods (M) typically involving a rechuck (reload) of the tape cartridge to brush and clean the head. More specific details again would be useful.

Figure 5:
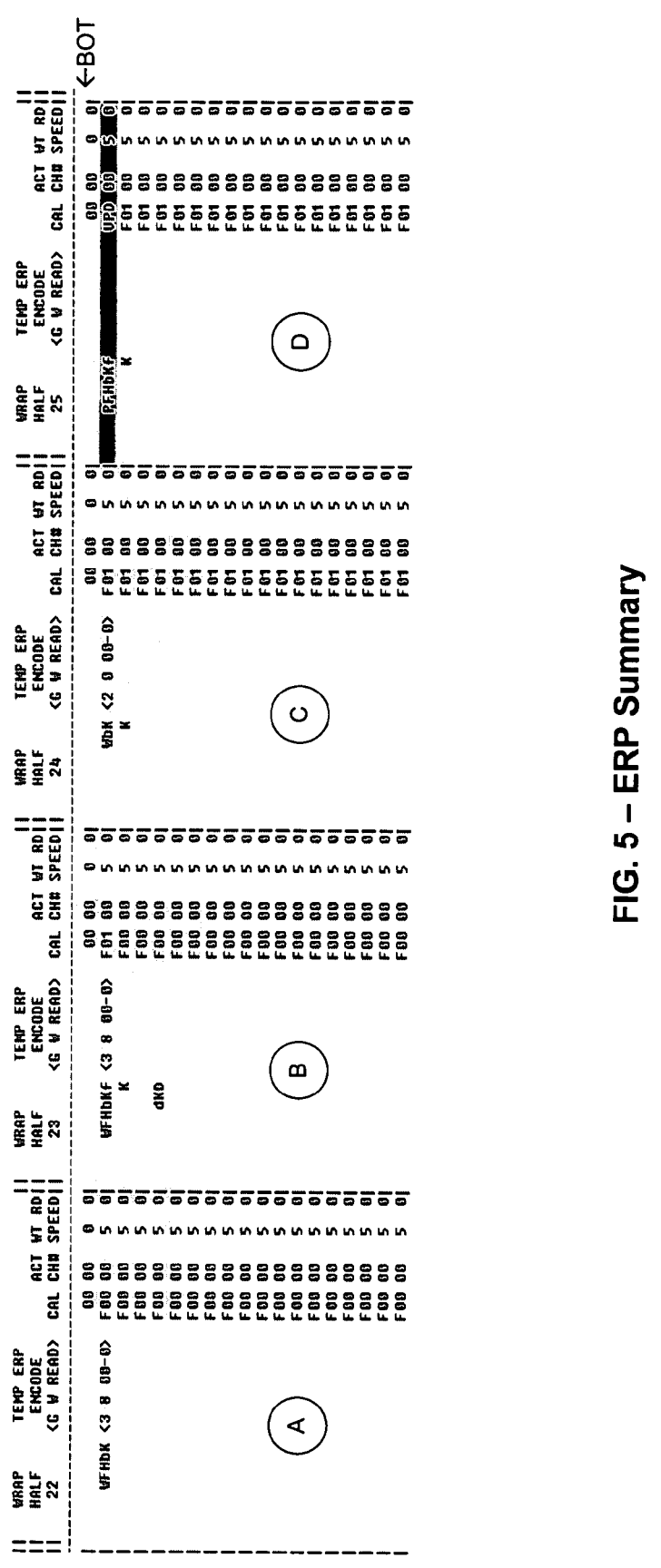

The table of FIG. 5 is illustrative of an ERP Summary report which presents a low-level summary of errors and specific recovery methods by LPOS region within each wrap. In the report, each section A, B, C and D represents a different wrap half, with wrap halves 22-25 being illustrated. Each row provides information for a different LPOS region, where the first row indicates the LPOS region closest to physical beginning of tape (BOT) and the last row indicates the LPOS region closest to the physical end of tape (EOT). The first column of each section is a summary of detected errors, represented by alpha-keys. The next column under "TEMP ERP ENCODE" is the lowest scope view of successful error recovery. In previous figures, error recovery was summarized by 5 different groups or classes: (S) servo modifications, (C) read/write channel modifications, (D) dataflow modifications, (M) mechanical modifications, and (N) no hardware modification required. In this ERP summary report, each class is further broken down into successful, specific recovery methods. The (N) and (M) classes are summarized as a bit-mask under General ERP. Write and read recovery variations are specific bit-encodes which span the (S), (C), and (D) classes. The data for General, Write and Read recovery variations may be decoded to, but are not limited to the following:

NM are encoded as General methods with 0×1 indicating mechanical (such as rechuck or stepper motor adjustment) and 0×2 indicating a simple recover requiring no changes;

SCD classes are bit-encoded masks that are interpreted differently depending on whether they represent a read or a write. Using write mode as an example, a 0×1 indicates a match filter, a 0×2 indicates thresholded action (in which a preventive ERP is performed due to a build-up of statistical data which is maintained by microcode and which exceeds predetermined thresholds), a 0×4 indicates a servo action and a 0×8 indicates a channel or calibration action. If a read, a 0×1 indicates a match filter, a 0×2 indicates an OppServo, a 0×4 indicates a servo action, a 0×8 indicates a channel or calibration action, a 0×10 indicates a dataflow and a 0×20 indicates a PES offset for servo tracking changes.

The third column in each section provides the number of channels involved in background asymmetry cancellation table (ACT) adjustment for the indicated wrap and LPOS region while the fourth and fifth columns provide an indication of the relative write and read speeds, respectively (higher values indicate slower speeds relative to 1 as the highest supported drive speed).

The Band Summary report of FIG. 3 revealed that some errors had been corrected in the second data band, wraps 22-25; the Detail Summary report of FIG. 4 focused on wrap 23 and further revealed that many of the recoveries in wrap 23 occurred in LPOS region 1. The ERP Summary report of FIG. 5 reveals the specific nature of the recoveries in wrap 23, along with those in the adjacent wraps. This report indicates persistent write temps in LPOS region 1 until a permanent write error is flagged in wrap 25 (the 'P' in the first column of the wrap 25 data). In LPOS Region 1 of wraps 22-24, general recovery methods included both simple and rechuck methods (the '2' and '3' in the general column of wraps 22-24) while write recovery methods required only calibration action (the '8' in the write column of wraps 22 and 23).

By employing the "telescoping" views provided by the present invention, pattern analysis may be performed at different resolutions. Thus, correlations of possible interactions (both positive and negative) between hardware and microcode activities that result in changes of the nominal operating point of the drive may be identified. Possible failure patterns may also be identified and fed back to design personnel and incorporated in microcode design changes for more effective ERP.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for multi-level mapping of tape error recoveries.

What is claimed is:

1. A method for mapping error corrections in a magnetic tape drive data storage system, comprising:
   performing data write and/or read operations on a tape medium mounted in a data storage tape drive;
   receiving information pertaining to successful recoveries from corresponding errors during the data operations;
   mapping the successful error recovery information to associate each error recovery with a physical location on the tape medium;
   mapping any hardware optimization of the read/write channel or servo system performed as a preventative measure;
   generating a first output report providing a first level of error recovery detail; and
   generating a second output report providing a second level of error recovery detail, the second output report having more of detail than the first output report.

2. The method of claim 1, wherein generating the first output report comprises generating a band summary in which each error recovery is identified by a recovery method, a data band in which the corresponding error occurred and a tape wrap in which the corresponding error occurred.

3. The method of claim 1, wherein generating the second output report comprises generating a detail summary in which each error recovery is identified by a recovery method, a tape wrap in which the corresponding error occurred and a longitudinal position (LPOS) region in which the corresponding error occurred.

4. The method of claim 1, further comprising generating a third output report providing a third level of error recovery detail, the third output report having being more detail than the second output report.

5. The method of claim 4, wherein generating the third output report comprises generating an ERP summary in which each error recovery is identified by a recovery method, a tape wrap in which the corresponding error occurred and a longitudinal position (LPOS) region in which the corresponding error occurred.

6. A system for mapping error corrections in a magnetic tape drive data storage system, comprising:
   an error recovery controller operable to initiate recovery processes in response to errors detected during data write and/or read operations on a tape medium mounted in a data storage tape drive;
   an error recovery controller operable to initiate preventative recovery processes in response to statistical assessment of read/write channel and servo performance detected during data write and/or read operations on a tape medium mounted in a data storage tape drive;
   an error recovery logger operable to record:
      locations of the errors on the tape medium;
      a recovery method associated with each error;
      a preventative recovery method associated with thresholded statistical performance data; and
      values of a plurality of operational parameters at the time of each error; and
   a report generator operable to generate:
      a first output report providing a first level of error recovery detail; and
      a second output report providing a second level of error recovery detail, the second output report having more of detail than the first output report.

7. The system of claim 6, wherein the first output report comprises a band summary in which each error recovery is identified by a recovery method, a data band in which the corresponding error occurred and a tape wrap in which the corresponding error occurred.

8. The system of claim 6, wherein the second output report comprises a detail summary in which each error recovery is identified by a recovery method, a tape wrap in which the corresponding error occurred and a longitudinal position (LPOS) region in which the corresponding error occurred.

9. The system of claim 6, further comprising a third output report providing a third level of error recovery detail, the third output report having being more detail on itemized hardware modification choices than the second output report.

10. The system of claim 9, wherein the third output report comprises an ERP summary in which each error recovery is identified by a recovery method, a tape wrap in which the corresponding error occurred and a longitudinal position (LPOS) region in which the corresponding error occurred.

* * * * *